United States Patent [19]

Kahl

[11] Patent Number: 4,464,151

[45] Date of Patent: Aug. 7, 1984

[54] SEALED CHAIN JOINT

[75] Inventor: James D. Kahl, Whitefish Bay, Wis.

[73] Assignee: Rexnord Inc., Brookfield, Wis.

[21] Appl. No.: 288,579

[22] Filed: Jul. 30, 1981

[51] Int. Cl.³ .............................................. F16G 13/06
[52] U.S. Cl. .................................... 474/231; 474/228; 474/230
[58] Field of Search ............... 474/226, 228, 230, 231; 305/11; 277/88, 89, 152, 153

[56] References Cited

U.S. PATENT DOCUMENTS

| | | |
|---|---|---|
| 1,223,050 | 4/1917 | Hoffknecht . |
| 1,945,357 | 1/1934 | Pierce .......................... 474/231 X |
| 2,336,913 | 12/1943 | Albrecht . |
| 2,411,207 | 11/1946 | Hait ...................................... 474/91 X |
| 2,431,702 | 12/1947 | McCann .............................. 474/231 |
| 2,509,436 | 5/1950 | Isenbarger ............................. 305/11 |
| 2,513,599 | 7/1950 | Thomas . |
| 2,525,365 | 10/1950 | Meyer ...................................... 277/89 |
| 2,647,025 | 7/1953 | Deffenbaugh ........................ 277/88 |
| 2,882,103 | 4/1959 | Johnson et al. ................. 474/230 X |
| 2,906,562 | 9/1959 | Burgman . |
| 3,062,067 | 11/1962 | Deming ................................ 474/230 |
| 3,135,128 | 6/1964 | Rudolph ......................... 474/230 X |
| 3,244,457 | 4/1966 | Ross .............................. 474/230 X |
| 3,336,089 | 8/1967 | Krickler . |
| 3,447,837 | 6/1969 | Deli et al. ...................... 474/230 X |
| 3,492,885 | 2/1970 | Nolte ............................. 474/230 X |
| 4,094,515 | 6/1978 | Araya et al. ................... 474/231 X |
| 4,315,750 | 2/1982 | Kawashima et al. ........... 474/231 X |

FOREIGN PATENT DOCUMENTS 874519  8/1942  France .................................. 277/89

OTHER PUBLICATIONS

"A Cartridge Type Pivotal Pin and Bushing Joint" Gerald L. Granda, Earthmoving Industry Conference 4/19–21/1982.

"Tracks-Links-Components", Caterpillar Tractor, Co., Form No. 40-20833 1965.

Primary Examiner—Lawrence J. Staab
Assistant Examiner—Dwight G. Diehl

[57] ABSTRACT

A chain link assembly comprising a pair of inner sidebar portions, each of the inner sidebar portions defining an aperture. A tubular-shaped bushing is secured to the pair of inner sidebar portions. The bushing includes a central portion and integral bushing extensions at each end of the central portion. The central portion of the bushing extends between the inner sidebar portions and into the apertures, and the bushing extensions project beyond the inner sidebar portions. The inside diameter of the bushing at any point along the bushing extensions is larger than the smallest inside diameter of the central portion.

8 Claims, 5 Drawing Figures

SEALED CHAIN JOINT

BACKGROUND OF THE INVENTION

This invention relates to chains, and, in particular, to a sealed chain joint.

In chains used in ditching machines, earth scraping machines, and in other applications involving operation in an abrasive environment, it is desirable to protect the chain bearings (the wear surface between pin outside diameter and bushing inside diameter) by keeping the bearing lubricated and by preventing abrasive material from entering the bearing surface.

U.S. Pat. No. 2,411,207 "Hait", which is incorporated herein by reference, discloses a chain bearing seal in which a bushing is inserted through openings in the sidebars of a first link so that it extends past those first sidebars and provides a spacer between the sidebars of the first link and the sidebars of the second link. The bushing extensions also provide mounting surfaces for supporting a flexible seal. Laboratory tests of a chain having a sealed joint similar to that disclosed by Hait have shown that, when the chain is operated under load, there is a relatively high failure rate. The pins which hold the joints together tend to flex and contact the portions of the bushing which extend past the first sidebars. Since the extended portions of the bushing are cantilevered beyond the first sidebars and have no axial support, the contact with a flexing pin tends to cause failure of the bushings.

Another problem with the seal shown in the Hait reference is that it will fail to seal if the two sidebars against which it seals separate any appreciable axial distance. This type of seal failure can be expected when the chains undergo high stresses which cause the gap between the inner and outer sidebars to widen.

A main object of the present invention is to obtain many of the benefits of a sealed chain joint such as that shown in the Hait reference, while reducing the problem of bushing failure due to contact with the pin at unsupported portions of the bushing. Another object is to provide a sealing member which maintains its seal against the sidebars even when the sidebars tend to separate under load.

SUMMARY OF THE INVENTION

The present invention provides a chain link assembly comprising a pair of inner sidebar portions, each of which defines an aperture. A substantially cylindrical bushing is secured to the pair of inner sidebar portions. The bushing includes a central portion with integral extensions at each end of the central portion, and the bushing is secured to the sidebars so that the integral extensions project beyond the inner sidebar portions. The inside diameter at any point along the extensions is larger than the smallest inside diameter of the central portion.

The extensions of the bushing provide a mounting surface onto which a flexible seal may be mounted. The extensions further provide a spacer between the inner sidebar portions of a first link and the outer sidebar portions of an adjoining second link in order to regulate the pressure on the flexible seal. The effect of the larger inside diameter of the extensions is that, when the pin flexes, it will continue to contact the central, supported portion of the bushing rather than the weaker, cantilevered extensions, thereby reducing bushing failure.

The present invention also provides an improved sealing member which maintains its seal even when the sidebars separate from each other so as to substantially change the length of the gap which the sealing member must span.

DESCRIPTION OF THE PREFERRED EMBODIMENTS

Figure 2:
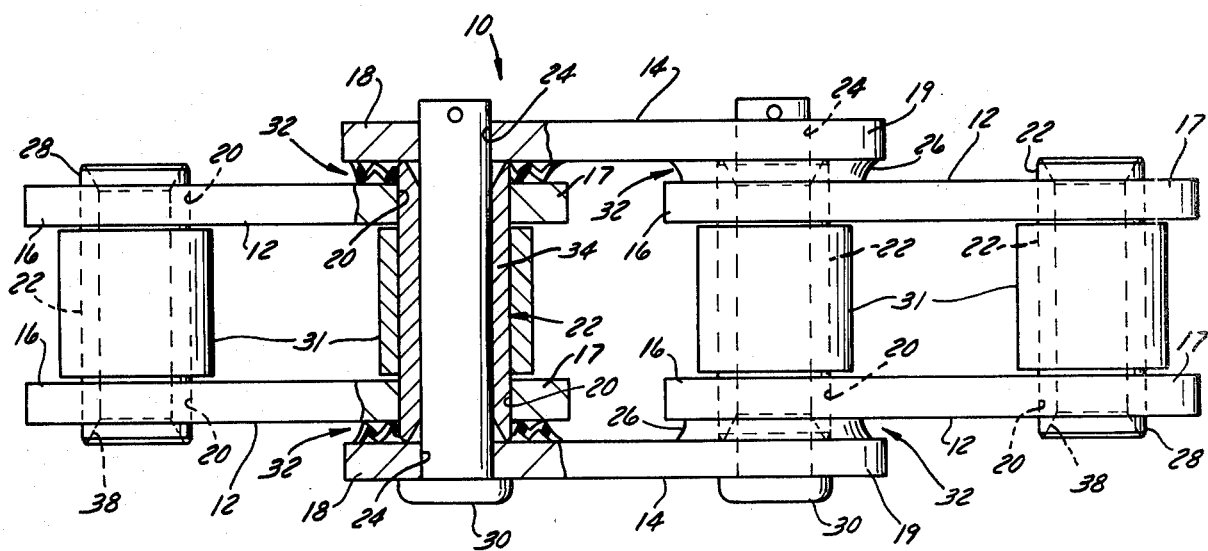
FIG. 2 is a top view partially in section of the chain shown in FIG. 1.
Figure 1:
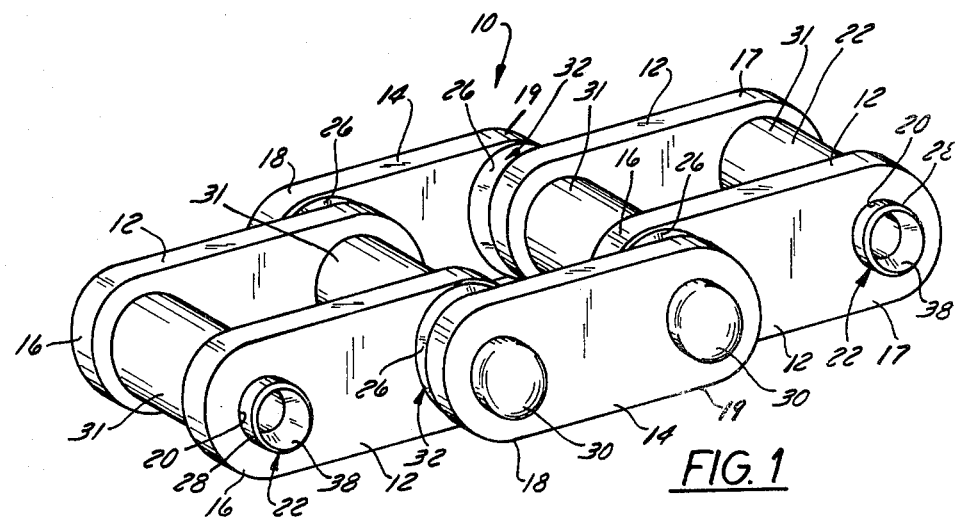
FIG. 1 is a perspective view of one embodiment of the present invention using a straight sidebar chain.

FIGS. 1 and 2 show a straight sidebar chain 10 which is made up of a plurality of pairs of inner sidebars 12 and a plurality of pairs of outer sidebars 14. Each inner sidebar 12 is an integral piece having opposite portions 16, 17. Each inner sidebar portion 16, 17 defines an aperture 20. There are two tubular-shaped bushings 22 secured to each pair of inner sidebars 12. Tubular-shaped bushings 22 will be described in more detail later.

Each outer sidebar 14 is an integral piece having opposite portions 18, 19. Each outer sidebar portion 18, 19 defines an opening 24 and is adjacent to an end of a bushing 22 in an adjacent inner sidebar 12 such that the opening 24 is aligned with an inner sidebar portion aperture 20.

Figure 5:
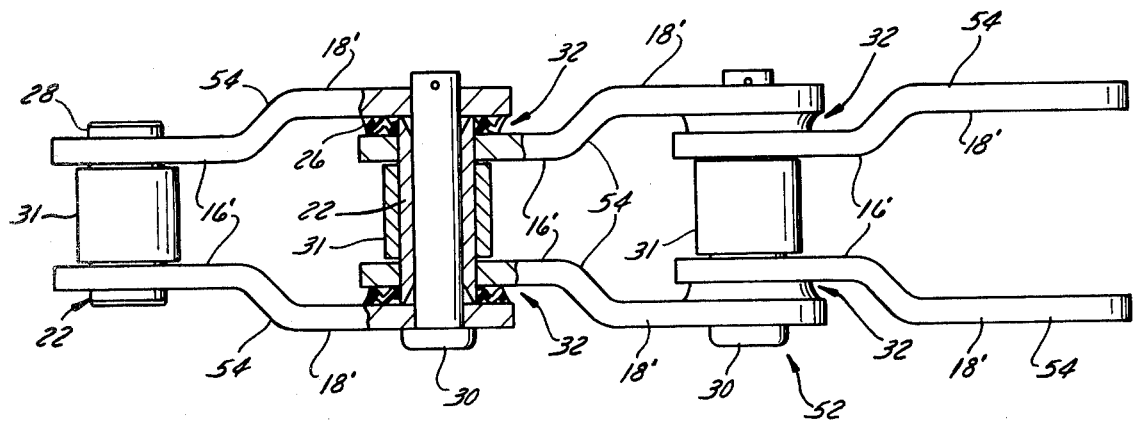
FIG. 5 is a top view of a second embodiment of the present invention using an offset sidebar chain.

A flexible sealing member 26 encircles each bushing extension 28, seals between an inner sidebar portion 16 or 17 and the outer sidebar portion 18 or 19 adjacent the bushing extension 28, and seals against the bushing extension 28. Flexible sealing member 26 will be described in more detail later. A pin 30 extends through each bushing 22 and through an opening 24 in the outer sidebar portions 18 or 19 which are adjacent to bushing 22, so as to form a chain joint 32. The ends of pin 30 are enlarged in some conventional manner known in the art in order to prevent pin 30 from sliding out of place. FIGS. 1, 2 and 5 show rollers 31 mounted over bushings 22. Rollers 31 are common in the art but are not required in order to practice the invention.

Figure 3:
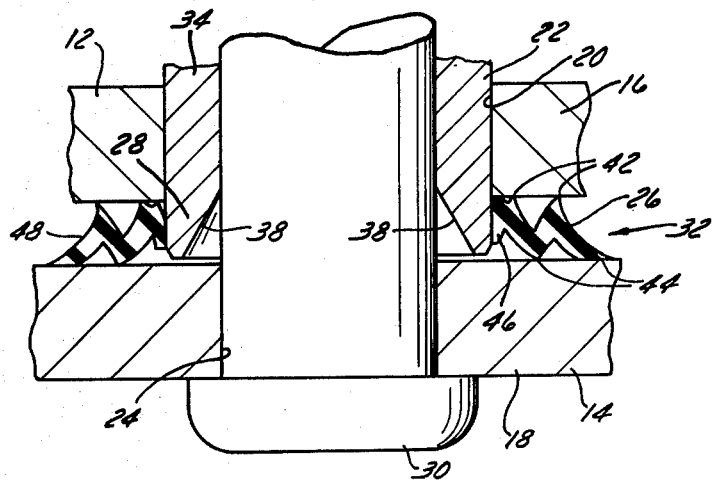
FIG. 3 is an enlarged broken away section of the chain joint shown in FIG. 2.
Figure 4:
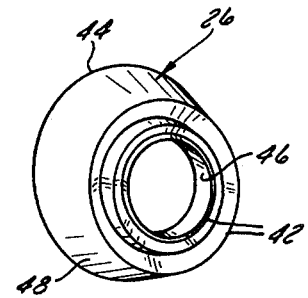
FIG. 4 is a perspective view of the seal shown in FIGS. 2 and 3.

Looking now at FIGS. 2 and 3 which show chain joint 32 in detail, it can be seen that bushing 22 has a central portion 34 and integral bushing extensions 28 at each end of central portion 34. Central portion 34 extends between a pair of inner sidebar portions 16 or 17 and into apertures 20 and is secured to inner sidebar portions 16 or 17, preferably by a press fit between the outer surface of central portion 34 and the inside surface of apertures 20. Bushing extensions 28 project beyond inner sidebar portions 16, 17. The inside diameter of openings 24 in outer sidebar portions 18, 19 is smaller than the outside diameter of bushing extensions 28, so that outer sidebar portions 18, 19 are adjacent the ends of bushings 22 and when openings 24 are aligned with apertures 20. Bushing extensions 28 thus provide a spacer between inner sidebar portions 16, 17 and outer sidebar portions 18, 19 and provide a surface against which flexible sealing member 26 may seal.

The inside surfaces 38 of bushing extensions 28 are tapered from a large inside diameter at the ends to a smaller inside diameter where the bushing extensions 28 meet the central portions 34, such that the inside diameter of bushings 22 at any point along bushing extensions 28 is larger than the smallest inside diameter of central portion 34. The purpose of the tapered inside surface 38 is to provide that pin 30 contacts only the central portion 34 of bushing 22 and does not contact the unsupported bushing extension 28. The inside surfaces 38 of bushing extensions 28 can be shaped in another manner as long as the extensions 28 have a larger inside diameter than the central portion 34.

Flexible sealing member 26 comprises an annular surface having radially alternating lower and upper contact points 42, 44. Lower contact points 42 seal against inner sidebar portions 16 or 17 and upper contact points 44 seal against outer sidebar portions 18 or 19. The radially innermost portion 46 of flexible sealing member 26 seals against bushing extension 28. The radially outermost portion 48 of flexible sealing member 26 has a height which is greater than the length of bushing extension 28 so that it is compressed between an inner sidebar portion 16 or 17 and an outer sidebar portion 18 or 19 and applies pressure to those sidebar portions in a spring-like fashion. Because of its height and spring-like characteristics, radially outermost portion 48 will stay in sealing contact with the inner and outer sidebar portions even when the sidebar portions move relative to each other so as to increase the gap across which flexible sealing member 26 must reach. Other known flexible sealing members such as "O" rings could be used in conjunction with the bushing extension 28, but flexible sealing member 26, shown herein, is preferred.

FIG. 5 shows an offset sidebar sealed chain 52 made up of a plurality of pairs of offset sidebars 54. Each offset sidebar is an integral piece made up of an inner sidebar portion 16' and an outer sidebar portion 18'. Except for the fact that offset sidebars 54 are used instead of inner and outer sidebars 12, 14, chain 52 shown in FIG. 5 is identical to chain 10 which was shown and described earlier.

It should be noted that flights may be attached to chains 10 and 52 for various purposes, such as, for example, flights in the form of blades for the purpose of digging trenches. It will be obvious to one skilled in the art that other modifications may be made to these embodiments without departing from the scope of the present invention.

What is claimed is:

1. A chain link assembly comprising:
a pair of inner sidebar portions, each of said inner sidebar portions defining an aperture;
a tubular-shaped bushing having opposite ends, inside and outside diameters, and an inside surface, and including a central portion and integral bushing extensions at each end of said central portion, said bushing being secured to said pair of inner sidebar portions such that said central portion extends between said inner sidebar portions and into each of said apertures, and such that said bushing extensions project beyond and adjacent to said inner sidebar portions, the inside diameter of each of said bushing extensions being tapered from a large inside diameter at the end of said bushing to a smaller inside diameter where said bushing extension meets said central portion of said bushing, and the inner diameter of said bushing at any point along said bushing extensions being larger than the smallest inside diameter of said central portion;
a pair of outer sidebar portions each defining an opening having a diameter smaller than the outside diameter of said bushing extensions, one of said outer sidebar portions being adjacent to one of said bushing extensions, and the other of said outer sidebar portions being adjacent to the other of said bushing extensions, and said openings in said pair of outer sidebar portions being substantially aligned with said apertures in said pair of inner sidebar portions;
a pair of resiliently flexible sealing members, one of said sealing members encircling one of said bushing extensions and being positioned between and engaging said adjacent inner sidebar portion and said adjacent outer sidebar portion, and the other of said sealing members encircling the other of said bushing extensions and being positioned between and engaging said adjacent inner sidebar portion and said adjacent outer sidebar portion, each of said sealing members being annular and comprising a plurality of radially spaced-apart annular concentric ridges, alternate ones of said ridges engaging said inner and outer sidebar portions, respectively, said sealing member providing at least two ridges in engagement with said inner sidebar portion and at least two ridges in engagement with said outer sidebar portion; and
a pin extending through said openings in said outer sidebar portions and through said bushing to form a chain joint.

2. A chain link assembly as recited in claim 1 wherein said bushing has a longitudinal axis, wherein said bushing extensions have a longitudinal length, and wherein each of said resiliently flexible sealing members further comprises a radially innermost portion which engages said encircled bushing extension and a radially outermost portion having a thickness measured parallel to the longitudinal axis of said bushing which is greater than the longitudinal length of said bushing extension.

3. A chain link assembly as recited in claim 2 wherein said radially outermost portion of said resiliently flexible sealing member is resiliently biased toward both of said inner and outer sidebar portions engaged by said sealing member so as to maintain sealing contact with said inner and outer sidebar portions when said inner and outer sidebar portions separate.

4. A straight sidebar sealed joint chain comprising:
a plurality of pairs of inner sidebars, each of said inner sidebars comprising two inner sidebar portions, each inner sidebar portion defining an aperture,
a plurality of tubular bushings each having an inside diameter, opposite ends, and a longitudinal axis and each including a central portion and integral bushing extensions at each end of said central portion, each bushing extension having an outer diameter and a longitudinal length, said bushings being secured to said pairs of inner sidebars such that said central portion extends between said inner sidebars and into said apertures in said inner sidebars, and such that said integral bushing extensions project beyond and adjacent to said inner sidebar portions, the inside diameter of each of said bushings at any point along said bushing extensions being larger than the smallest inside diameter of said central portion;

a plurality of pairs of outer sidebars, each of said outer sidebars comprising two outer sidebar portions, each outer sidebar portion defining an opening having a diameter smaller than the outer diameter of said bushing extensions, said outer sidebar portions being adjacent to said ends of said bushings, said openings in said adjacent outer sidebar portions being aligned with said apertures in said inner sidebar portions through which said bushing extends;

a plurality of resiliently flexible sealing members encircling said bushing extensions and being positioned between and engaging said inner and outer sidebar portions adjacent to said bushing extension, each of said sealing members being annular and comprising a plurality of radially spaced-apart annular concentric ridges, alternate ones of said ridges engaging said inner and outer sidebar portions, respectively, said sealing member providing at least two ridges in engagement with said inner sidebar portion and at least two ridges in engagement with said outer sidebar portion; and a pin extending through each of said bushings and through said openings in said outer sidebar portions adjacent to said bushing, so as to form a chain joint.

5. A straight sidebar sealed joint chain as recited in claim 4 wherein each of said resiliently flexible sealing members further comprises a radially innermost portion which engages said encircled bushing extension and a radially outermost portion having a thickness measured parallel to the longitudinal axis of said bushing which is greater than the longitudinal length of said bushing extension.

6. An offset sidebar sealed joint chain comprising:
a plurality of pairs of offset sidebars, each of said offset sidebars including an inner sidebar portion and an outer sidebar portion, each of said outer sidebar portions defining an opening and each of said inner sidebar portions defining an aperture;

a plurality of tubular-shaped bushings each having an inside diameter, opposite ends, and a longitudinal axis, and each including a central portion and integral bushing extensions at each end of said central portion, said bushing extensions each having an outer diameter and a longitudinal length, said bushings being secured to said pairs of offset sidebars such that said central portion extends between said inner sidebar portions and into said apertures in said inner sidebar portions, and such that said integral bushing extensions project beyond and adjacent to said inner sidebar portions, the inside diameter of each of said bushings at any point along said bushing extensions being larger than the smallest inside diameter of said central portion, and said bushing ends being adjacent to said openings in said outer sidebar portions of another pair of offset sidebars;

a plurality of pins extending through said bushings and through said outer sidebar portion openings adjacent to the ends of said bushings; and a plurality of resiliently flexible sealing members encircling said bushing extensions and being positioned between and engaging said adjacent inner sidebar portion and said adjacent outer sidebar portion, each of said sealing members being annular and comprising a plurality of radially spaced-apart annular concentric ridges, alternate ones of said ridges engaging said inner and outer sidebar portions, respectively, said sealing member providing at least two ridges in engagement with said inner sidebar portion and at least two ridges in engagement with said outer sidebar portion.

7. An offset sidebar sealed joint chain as recited in claim 6 wherein each of said resiliently flexible sealing members further comprises a radially innermost portion which engages said encircled bushing extension and a radially outermost portion having a thickness measured parallel to the longitudinal axis of said bushing which is greater than the longitudinal length of said bushing extension.

8. A chain link assembly comprising:
a pair of inner sidebar portions, each of said inner sidebar portions defining an aperture;

a tubular-shaped bushing having an inside diameter and opposite ends and including a central portion and integral bushing extensions at each end of said central portion, said bushing extensions having an outside diameter, said bushing being secured to said pair of inner sidebar portions such that said central portion extends between said inner sidebar portions and into each of said apertures, and such that said bushing extensions project beyond and adjacent to said inner sidebar portions;

a pair of outer sidebar portions each defining an opening having a diameter smaller than the outside diameter of said bushing extensions, one of said outer sidebar portions being adjacent to one of said bushing extensions, and the other of said outer sidebar portions being adjacent to the other of said bushing extensions, and said openings in said pair of outer sidebar portions being aligned with said apertures in said pair of inner sidebar portions; and a pair of resiliently flexible sealing members, one of said sealing members encircling one of said bushing extensions and being positioned between and engaging said inner and outer sidebar portions adjacent said bushing extension, and the other of said sealing members encircling the other of said bushing extensions and being positioned between and engaging said inner and outer sidebar portions adjacent said bushing extension, each resiliently flexible sealing member being annular and comprising a plurality of radially spaced-apart annular concentric ridges, alternate ones of said ridges engaging said inner and outer sidebar portions, respectively, said sealing member providing at least two ridges in engagement with said inner sidebar portion and at least two ridges in engagement with said outer sidebar portion.

* * * * *